United States Patent
Roos

(10) Patent No.: US 10,211,695 B2
(45) Date of Patent: Feb. 19, 2019

(54) STATOR COMPONENT GROUP FOR AN ELECTRIC MOTOR

(71) Applicant: BROSE FAHRZEUGTEILE GMBH & CO. KOMMANDITGESELLSCHAFT, Wuerzburg (DE)

(72) Inventor: Stephan Roos, Wertheim-Hoehefeld (DE)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 364 days.

(21) Appl. No.: 15/055,816

(22) Filed: Feb. 29, 2016

(65) Prior Publication Data

US 2016/0261161 A1  Sep. 8, 2016

(30) Foreign Application Priority Data

Feb. 27, 2015 (DE) .......................... 10 2015 002 562
Sep. 4, 2015 (DE) .......................... 10 2015 217 017

(51) Int. Cl.
*H02K 3/52* (2006.01)

(52) U.S. Cl.
CPC .................... *H02K 3/522* (2013.01)

(58) Field of Classification Search
CPC  H02K 3/52; H02K 1/14; H02K 15/00; H02K 3/28; H02K 5/04; H02K 3/521; H02K 15/0068
USPC .......................................... 310/71, 260, 270
See application file for complete search history.

(56) References Cited

U.S. PATENT DOCUMENTS

| 7,847,446 | B2 | 12/2010 | Becker et al. | |
| 8,466,590 | B2 * | 6/2013 | Hauser | H02K 3/522 310/68 B |
| 9,160,217 | B2 | 10/2015 | Nakagawa | |
| 2011/0181221 | A1 | 7/2011 | Asahi et al. | |
| 2012/0286593 | A1 | 11/2012 | Yokogawa et al. | |
| 2013/0257183 | A1 * | 10/2013 | Yokogawa | H02K 5/02 310/43 |

(Continued)

FOREIGN PATENT DOCUMENTS

| CN | 1251478 A | 4/2000 |
| DE | 102005062784 A1 | 7/2007 |
| DE | 102006032780 A1 | 1/2008 |

(Continued)

*Primary Examiner* — Naishadh Desai
(74) *Attorney, Agent, or Firm* — Laurence A. Greenberg; Werner H. Stemer; Ralph E. Locher

(57) ABSTRACT

A stator module for an electric motor has a stator laminated core with a number of inwardly directed stator teeth and a rotating-field winding with a plurality of phases arranged on the stator teeth. The rotating-field winding has at least one coil per phase, which coil is electrically connected to a first phase end and a second phase end. A laying ring is placed onto the stator laminated core at the end face and surrounds the stator teeth as coil body in order to guide the rotating-field winding. An annular cover is placed onto the laying ring at the end face, on which cover each of the phase ends is contacted with one of the phase ends of another phase, in such a way that the entire rotating-field winding does not protrude radially externally beyond an outer periphery of the stator laminated core.

9 Claims, 7 Drawing Sheets

(56) References Cited

U.S. PATENT DOCUMENTS

2015/0008803 A1* 1/2015 Furukawa ................ H02K 3/34
310/68 D
2015/0326097 A1* 11/2015 Kuwata .................. H02K 29/08
310/68 B

FOREIGN PATENT DOCUMENTS

| DE | 102008040318 A1 | 1/2010 |
| DE | 10 2008 055 731 A1 | 5/2010 |
| DE | 11 2011 100 325 T5 | 10/2012 |
| DE | 102012106471 A1 | 2/2014 |
| EP | 0727864 A2 | 8/1996 |

* cited by examiner

STATOR COMPONENT GROUP FOR AN ELECTRIC MOTOR

BACKGROUND OF THE INVENTION

Field of the Invention

The invention relates to a stator module for an electric motor, having a stator laminated core which has a number of inwardly directed stator teeth, and having a rotating-field winding arranged on the stator teeth, and having a plurality of phases. The invention also relates to an electric motor for an actuator of a motor vehicle comprising a stator module of this type.

An electric motor, which in particular is brushless, as electric three-phase machine has a stator module comprising a stator laminated core having a number of stator teeth arranged for example in a star pattern, which stator teeth carry an electric rotating-field winding in the form of individual stator coils, which are in turn wound from an insulating wire. The coils are paired via their coil ends with individual strands or phases and are connected to one another in a predetermined manner via contact elements.

In the case of a brushless electric motor as three-phase machine, the stator module has three phases and therefore at least three phase conductors or phase windings, which are each exposed to electric current in a phase-offset manner in order to generate a magnetic rotating field, in which a rotor or rotating part usually provided with permanent magnets rotates. The phase ends of the phase windings are guided to a motor electronics unit in order to control the electric motor. The coils of the rotating-field winding are connected to one another in a specific way by means of the phase ends. The type of connection is determined by the winding pattern of the rotating-field winding, a star connection or a delta connection of the phase windings constituting a conventional winding pattern.

The rotating-field winding is typically applied to the stator teeth of the stator laminated core in a fully automated manner by means of a single-needle or preferably by means of a multi-needle winding method. The phase conductors or winding wires in this case, due to the method, cannot be wound axially over the stator teeth from stator tooth to stator tooth, since otherwise the winding wires would collide with the winding tool. In order to avoid this problem, it is known for example to arrange what are known as laying rings on the end faces of the stator laminated core.

Laying rings of this type are placed for example in pairs onto the end faces of the stator laminated core and each have sleeve-like receptacles for the stator teeth, such that the stator teeth are surrounded substantially by insulating coil or winding bodies due to the receptacles in the laying rings. The coil bodies for example have groove-like indentations for guiding the winding wires and/or side walls in order to avoid a (radial) detachment of the finished coil from the stator tooth. At least one of the laying rings typically comprises what is known as a termination, which, as a segmented circular wall, protrudes axially beyond the stator laminated core. Due to the termination, the winding wires can be guided during a winding process peripherally behind the stator teeth from stator tooth to stator tooth, such that the winding wires do not collide with the winding tool.

The contacting of the wire ends or phase ends during the course of the connection of the rotating-field winding can be implemented by means of insulation-displacement contacts as contact elements, which are arranged radially outside the winding region and the termination with respect to the stator laminated core. For this purpose, the phase ends to be contacted are pushed into a sleeve-like insulation displacement terminal and are mechanically fixed within the insulation-displacement terminal to a metal clamping connector insertable into the insulation-displacement terminal. The clamping connector typically has at least one blade, which upon insertion into the insulation-displacement terminal severs the insulation of the insulating wire of the phase ends in such a way that, when a clamping connector is inserted, the phase ends are electrically conductively coupled to the clamping connector. The clamping connectors are contacted in the mounted state with the motor electronics in order to feed current to the phases.

For the rotatable mounting of a rotor shaft of the rotor, the electric motor comprises a cup-like bearing support, which is usually secured radially outside the phase contact. Both the phase contact and the bearing support thus sometimes project at least in part beyond an outer periphery of the stator laminated core. A motor housing of an electric motor of this type typically has a collar in this region so as to be able to completely receive the stator module.

The collar is detrimental to a complete and effective use of an available installation space, and therefore the motor diameter sometimes has to be reduced, whereby the power that can be provided by the three-phase machine is limited.

BRIEF SUMMARY OF THE INVENTION

The object of the invention is to specify a stator module for an electric motor making it possible to connect the phase ends of a rotating-field winding within an outer periphery of the stator laminated core. An electric motor for an actuator of a motor vehicle comprising a stator module of this type will also be specified.

The aforementioned objects are achieved in accordance with the invention in respect of the stator module by the features as claimed, and in respect of an electric motor comprising the stator module by the features as claimed. Advantageous embodiments and developments are disclosed in the respective dependent claims.

The stator module according to the invention comprises a stator laminated core having a number of stator teeth arranged in a star pattern and directed inwardly. The stator teeth have a rotating-field winding comprising a plurality of phases, the rotating-field winding comprising at least one coil for each phase. A coil wire or winding wire of the coil for this purpose has a first phase end and a second phase end, by means of which the coil is electrically connected. A laying ring made of an insulating material, in particular of a plastics material, is placed onto the stator laminated core at the end face and surrounds the stator teeth as a coil body in order to guide the rotating-field winding. An annular cover is placed onto the laying ring at the end face, on which cover each of the phase ends is contacted with one of the phase ends of another phase in such a way that the entire rotating-field winding does not protrude radially externally beyond an outer periphery of the stator laminated core. In other words, the rotating-field winding is arranged completely radially inside the outer periphery of the stator laminated core as viewed along the axial axis of the stator laminated core, parts of the rotating-field winding, however, in particular the phase ends, possibly extending axially beyond the stator laminated core.

Due to the annular cover, the phase ends therefore are not contacted and connected radially outside the winding region with respect to the stator laminated core (in contrast to the prior art), but instead substantially axially above the winding region. The overall radial size of the stator module thus reduces substantially to the stator diameter of the stator laminated core. The stator module is therefore particularly suitable for being arranged in a motor housing without collar during the course of the mounting of an electric motor. In an installation situation with a predefined installation diameter, the stator diameter of the stator module or a motor diameter of a corresponding electric motor can therefore be dimensioned maximally, which also advantageously affects the electrical and mechanical power of the corresponding electric motor.

In a suitable embodiment the annular cover is produced from an electrically insulating material, in particular from a plastics material. The annular cover and the laying ring can therefore be produced easily and economically, for example as injection-molded parts.

In an advantageous development contact elements for contacting and fixing the phase ends are fastened, integrally formed or mounted on an outer side of the annular cover facing away from the stator laminated core, whereby a more reliable contacting of the phase ends on the annular cover is ensured.

In a preferred embodiment the contact elements are embodied as insulation-displacement contacts. The phase ends are thus contacted with one another in a particularly simple and economical manner, and are fixed to one another both in an interlocking and frictionally engaged manner on the outer side of the annular cover.

In a suitable embodiment the rotating-field winding is a three-phase winding, the phase ends contacted with one another being in a delta connection. For this purpose, three contact elements or insulation-displacement contacts are expediently provided on the annular cover in order to contact and connect the six phase ends. The stator module can thus be used practically for all established electric motors, in particular in respect of the contacting or current feed of the phases with an associated motor electronics unit.

In a preferred embodiment the contact elements are uniformly distributed exactly or approximately on the annular cover in the peripheral direction. A particularly expedient laying path to the contact elements, which in view of the required phase end lengths is particularly short, is thus provided. By way of example, the three contact elements in the course of a delta connection are thus arranged on the outer side of the annular cover offset from one another by approximately 120°. The three-phase rotating-field winding is wound suitably in a three-needle winding method onto the stator teeth and the laying ring, the phase ends to be contacted of the three phase windings being arranged on the laying ring oriented at approximately 120° relative to one another. The contact elements are thus arranged in a manner complementary to the positions of the phase ends to be contacted, whereby particularly short laying and guidance paths are provided from the laying ring to the contact elements, which as a result of a material saving advantageously affects the production costs of the stator module.

In an advantageous embodiment each phase end is provided with a recess in the annular cover, through which the respective phase ends are guided from the laying ring to the outer side of the annular cover facing away from the stator laminated core. Particularly short and direct laying paths of the phase ends from the laying ring to the contact elements are thus ensured, which thus contributes to an additional material and cost saving.

For the purposes of the simplest laying of the phase ends to the contact elements, the recesses are embodied in an advantageous embodiment as slots, which are open toward an outer periphery of the annular cover. The phase ends during the assembly of the stator module therefore do not have to be threaded through the recesses, which is laborious, but instead can be introduced comparatively easily from the outer periphery of the annular cover into the region of the associated contact elements.

In a preferred embodiment guide elements for guiding the phase ends are integrally formed or mounted on the outer side of the annular cover. The guide elements are each arranged expediently in a region between the recesses and the contact elements, whereby a particularly simple laying of the phase ends from the laying ring to the contact elements is ensured.

In a suitable embodiment the guide elements are formed for example as laying ramps having furrow-like guide grooves, which guide the phase ends to the contact elements in a manner inclined at an angle of inclination. The laying ramps are arranged for example staggered in the peripheral direction, i.e. in each case a first laying ramp is arranged preferably between the recesses in the annular cover for the phase ends to be contacted, and in each case a second laying ramp is arranged between the contact element recess and the contact element. In particular, a tangentially directed guidance of the phase ends, in which they are arranged axially one above the other, to the contact element is provided as a result. A particularly space-saving arrangement is thus provided, which also enables a particularly easy contacting in the context of an insulation-displacement contact.

In a suitable development the laying ring has a termination relative to the peripheral guidance of the rotating-field winding behind the stator teeth, said termination protruding axially beyond the stator laminated core, the annular cover being latched to the termination. As a result of the latched connection, a simple and destruction-free fastening of the annular cover on the stator laminated core is made possible. It is also ensured by the termination that the rotating-field winding can be applied without difficulty to the stator teeth in the course of a multi-needle winding process, in particular in the course of a three-needle winding process. The termination preferably has detent elements toward the outer periphery of the stator laminated core, which detent elements can be latched, clipped or snap-fitted to corresponding detent receptacles in the annular cover. The detent elements of the termination by way of example are also suitable and arranged, in the context of providing the greatest possible flexibility and functionality, to act as guide elements in order to peripherally guide the rotating-field winding behind the stator teeth.

In a preferred application the stator module is installed in an electric motor for an actuator, in particular for a transmission actuator of a motor vehicle. The electric motor, which preferably is brushless, comprises a cylindrical motor housing, which receives the stator module substantially in an interlocking manner. A rotor together with a motor shaft fixed to the rotor is arranged rotatably within the stator laminated core, the annular cover expediently having a central recess for the motor shaft. For the purposes of a coupling, for example to a hydraulic oil pump of the actuator, the motor shaft is guided out, thus forming a shaft journal on a housing side of the electric motor, whereas the opposite housing side for example has a connection flange for fastening the actuator to a motor vehicle transmission, in particular a dual-clutch or direct shift transmission.

BRIEF DESCRIPTION OF THE SEVERAL VIEWS OF THE DRAWING

An exemplary embodiment of the invention will be explained in greater detail hereinafter on the basis of a drawing, in which.

DESCRIPTION OF THE INVENTION

Parts and sizes corresponding to one another are always provided in all figures with the same reference signs.

Figure 1:
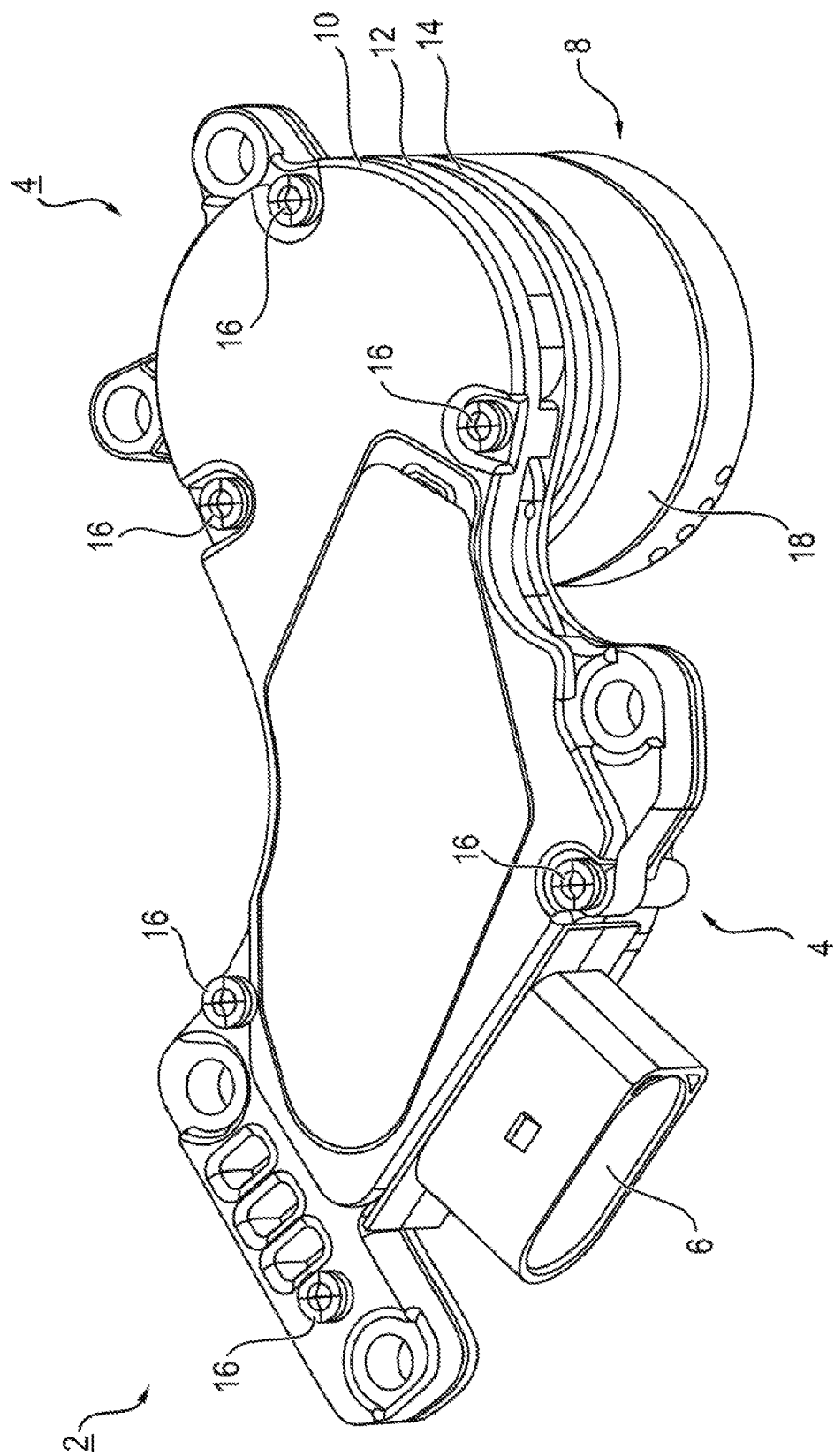
FIG. 1 shows, in a perspective illustration, a motor module for a transmission actuator of a motor vehicle transmission, comprising an electric motor and electronics unit.

FIG. 1 shows a motor module 2 for a transmission actuator (not illustrated in greater detail) of a motor vehicle transmission, in particular a direct shift transmission. The motor module 2 comprises an elongate electronics unit 4 with a plug connector 6 protruding on the narrow side and an electric motor 8 fastened to the electronics unit 4.

The electronics unit 4 has a first housing shell formed as a motor support 10, a second housing shell formed as a cooling cover 12, and an electronics support 14 arranged in a sandwich-like manner between the motor support 10 and the cooling cover 12, the plug connector 6 being integrally formed in one piece on the electronics support 14. By means of the plug connector 6, a converter circuit (not illustrated in greater detail) of the electronics support 14 is electrically conductively coupled to a motor vehicle electronics system (not illustrated in greater detail) or to a motor vehicle branch in order to feed current and to operate the electric motor 8.

The motor support 10 and the cooling cover 12 are screwed to one another at six fastening screws 16 distributed over the periphery, the electronics support 14 being held or fixed in a clamped manner between the motor support 10 and the cooling cover 12.

Figure 2:
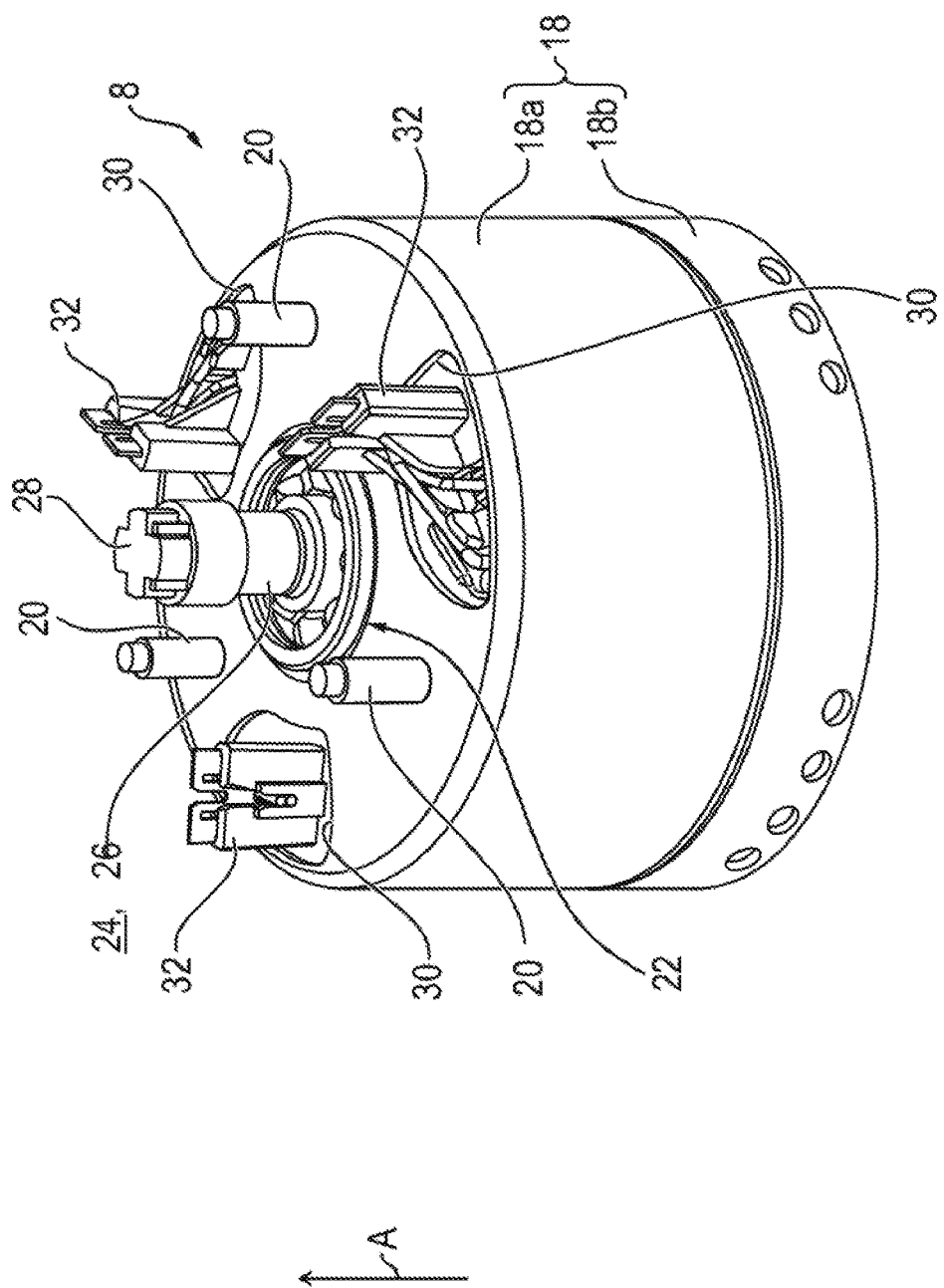
FIG. 2 shows, in a perspective illustration, the electric motor with a motor housing and with a rotor shaft coupled to a rotor.

A cylindrical motor housing 18 of the preferably brushless electric motor 8 is screwed to the motor support 10. As can be seen in FIG. 2, the motor housing 18 is formed substantially by a first cup-like housing half 18a and a second cup-like housing half 18b, the housing half 18a being embodied with a housing height approximately twice as tall as that of the housing half 18b with respect to a housing axial direction A. The housing half 18a in the mounted state is fastened to the motor support 10 by means of three threaded bolts 20, which are arranged at the end face, on the face facing toward the motor support 10, offset approximately uniformly from one another by 120°.

The housing half 18a has an approximately circular recess 22 for a rotor shaft 24 of a rotor 26 coupled thereto in terms of drive. A magnetic cap 28, as magnetic dipole transmitter, is mounted in a rotationally fixed manner on the motor support-side end face of the rotor shaft 24. The cap 28 has a number of permanent magnets and lies in the mounted state in a receptacle of the electronics support 14. In the region of the receptacle, there is arranged a Hall sensor element, which during operation monitors a rotational speed of the electric motor 8 by means of the magnetic alternating field of the rotating cap 28.

The housing half 18a also has, at the end face, three oval-like recesses 30 offset radially from the recess 22 toward the outer periphery. The recesses 30 are arranged peripherally in a manner distributed approximately uniformly around the recess 22. In the mounted state a contact element 32 of an annular cover 34 protrudes through each of the recesses 30.

As can be seen in particular in conjunction with FIGS. 3 to 7, the housing halves 18a and 18b are placed on a stator module 36 of the electric motor 8 in the assembled state, the structure of the stator module 36 being explained in greater detail hereinafter on the basis of FIGS. 3 to 7.

Figure 3:
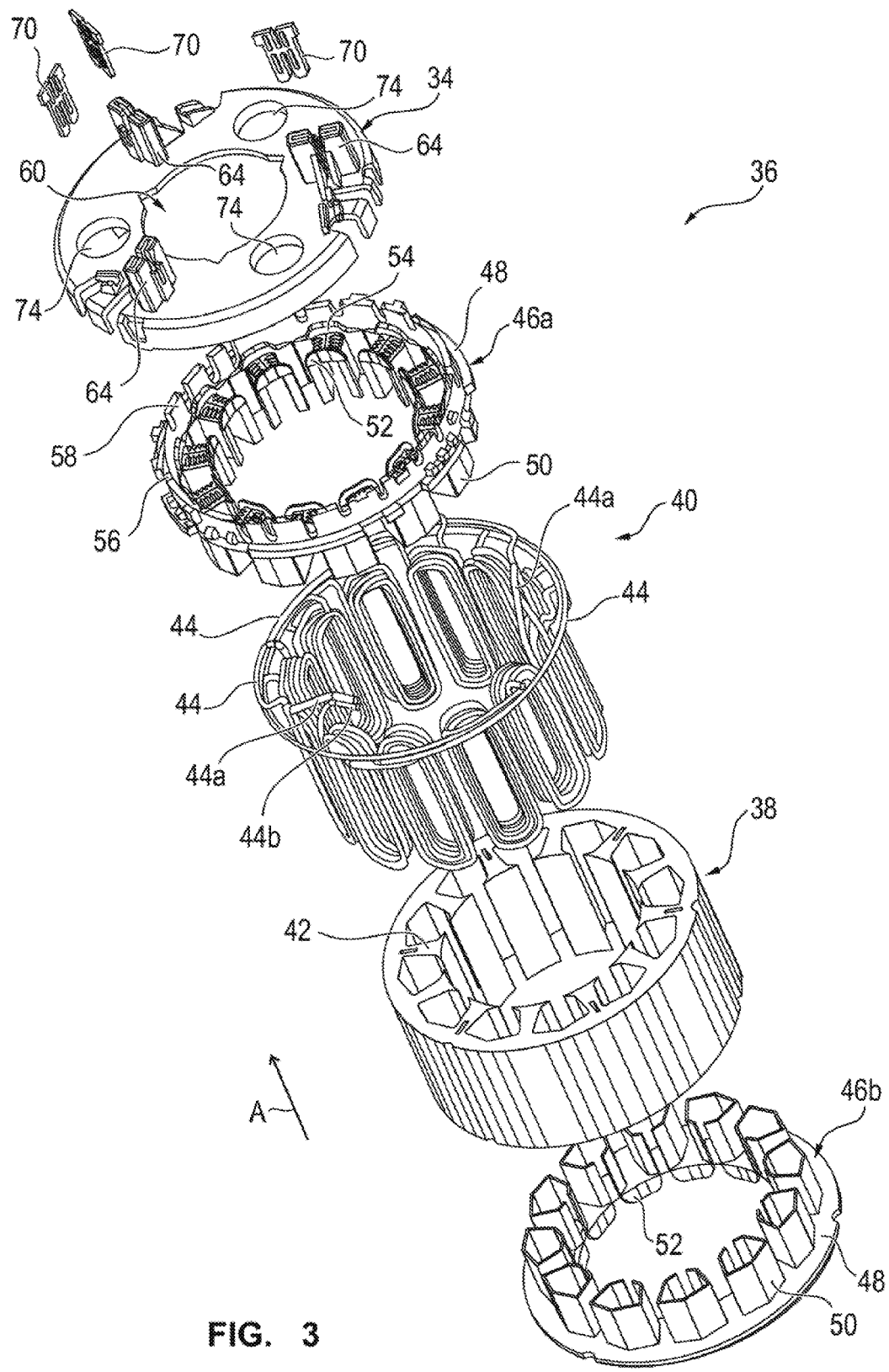
FIG. 3 shows, in an exploded illustration, a three-phase stator module of the electric motor.

FIG. 3 shows the electric motor 8 on the basis of an exploded illustration in a state in which the parts have been removed from one another. The electric motor 8 is formed substantially by the stator module 36, which has a stator laminated core 38, around which a three-phase rotating-field winding 40 is wound in the form of coils. The rotor 26 is rotatably mounted in the assembled state rotatably inside the stationary stator module 36 about a motor axis of rotation along the housing axial direction A. The rotor 26 is formed (in a manner not illustrated in greater detail) by a laminated core, in which permanent magnets are inserted in order to generate an exciting field.

The stator laminated core 38 has an approximately star-like arrangement with twelve inwardly directed stator teeth 42, a phase winding 44 being wound, for each phase of the rotating-field winding 40, around two adjacent stator teeth 42 and around the two stator teeth 42 arranged diametrically opposed in relation thereto in the stator laminated core 38, so as to form a magnet pole. By way of example, merely one stator tooth 42 has been provided with a reference sign in the figures.

An electric current is passed through the three phase windings 44 during operation of the electric motor 8, and said phase windings thus form six magnetic pole regions of the stator module 36. In order to guide and lay the phase windings 44 on the stator teeth 42, the stator module 36 comprises two laying rings 46a and 46b. The laying rings 46a, 46b are placed axially onto the stator laminated core 38, one at each end face thereof.

The laying rings 46a, 46b produced from an insulating plastics material both have an annular body 48, on which, on the stator lamination side, twelve half-sleeve-like coil bodies 50 are integrally formed as pole shoe-like receptacles for the stator teeth 42. In the placed-on state, the stator teeth 42 are thus surrounded substantially by the insulating coil bodies 50 of the laying rings 46a and 46b, in such a way that merely the pole shoe-side ends of the stator teeth protrude freely.

The phase windings 44 are wound as coils onto the coil bodies 50 of the laying rings 46a, 46b around the stator teeth 42 in a three-needle winding process with an insulated copper wire. So that the coils do not detach from the coil bodies 50 in the wound state, each coil body 50 has a radially internal inner flange 52 with respect to the stator laminated core and an outer flange 54, offset radially outwardly in relation hereto, as delimiting side walls. For the purpose of contacting the coil windings against the coil bodies 50 with minimal vibration, the coil bodies 50 have groove-like indentations 56 at least on the axial bearing surfaces above and below the stator tooth 42, in which indentations the windings of the coils lie at least in part. By way of example, merely one coil body 50, one inner flange 52, one outer flange 54, and one indentation 56 have been provided with a reference sign in the figures.

Figure 4:
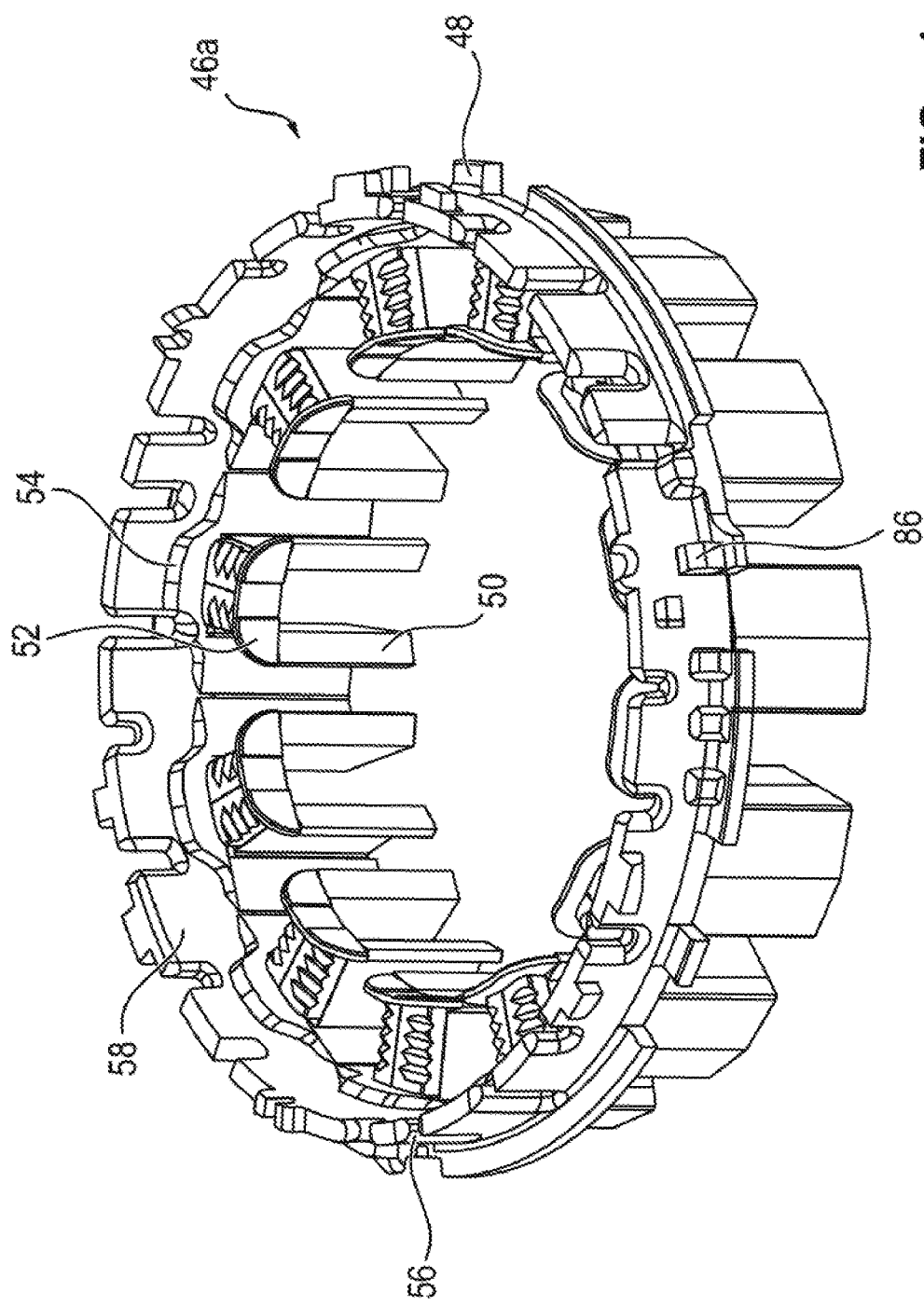
FIG. 4 shows, in a perspective illustration, a laying ring of the stator module.
Figure 5:
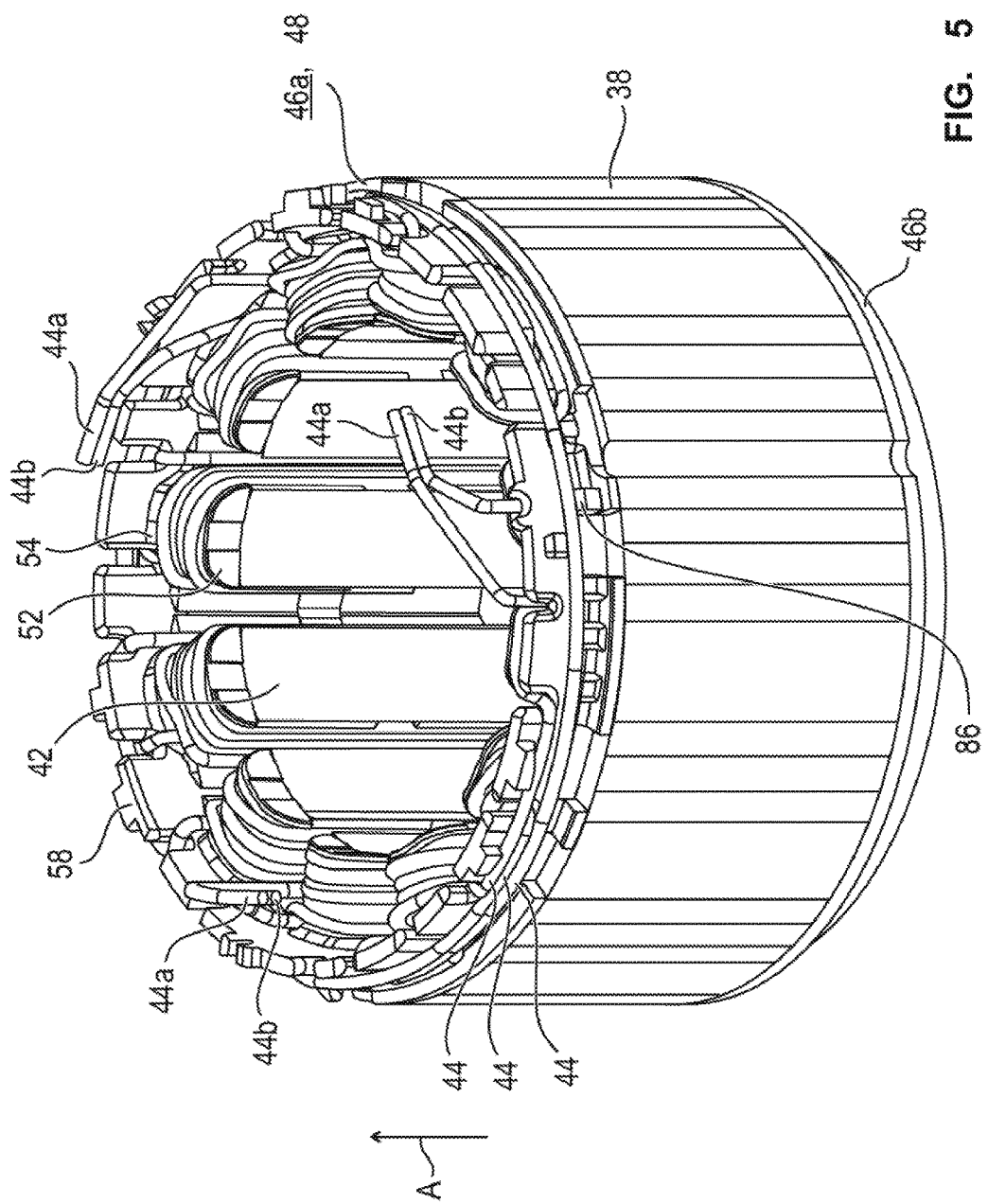
FIG. 5 shows, in a perspective illustration, a stator laminated core of the stator module, comprising the laying ring placed on at the end face and a rotating-field winding.

The laying ring 46a illustrated in FIG. 4 has a segmented, annular-like wall as termination 58. As can be seen in particular in FIG. 5, the termination 58 protrudes axially beyond the stator laminated core 38 along the housing axial direction A in the assembled state. When winding the coils, the phase windings 44 are guided in the course of the three-needle winding process through the termination at the periphery thereof behind the stator teeth 42 so as to form the magnet poles.

Figure 6:
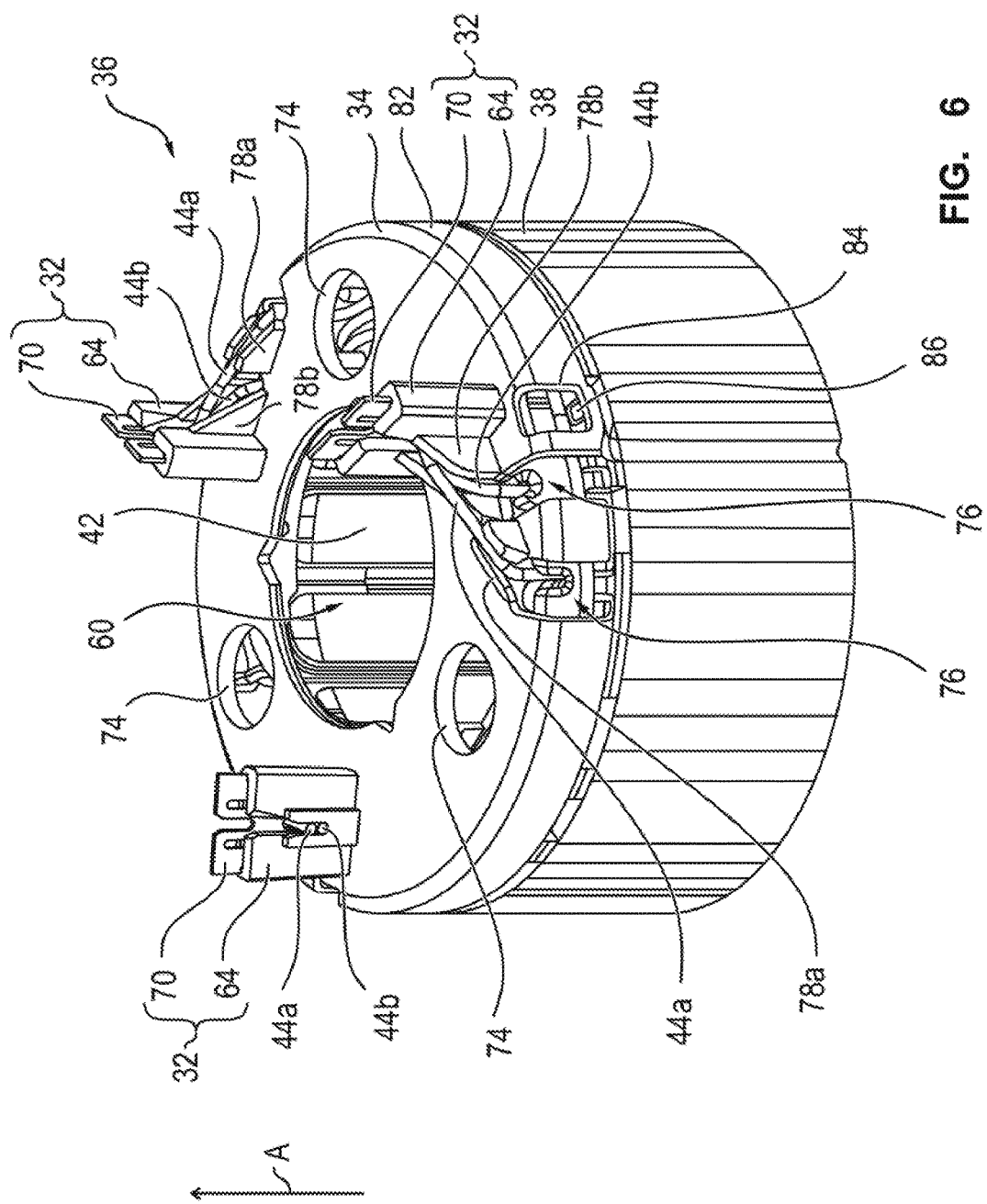
FIG. 6 shows, in a perspective illustration, the stator module with an annular cover comprising three insulation-displacement contacts.

The three phase windings 44 each have a first phase end 44a and a second phase end 44b as ends of the respective winding wires. The phase ends 44a of the respective phase windings 44 are connected and contacted to the second phase ends 44b of a different phase winding 44 via the contact elements 32, also referred to hereinafter as insulation-displacement contacts, in a delta connection on the annular cover 34. For this purpose, the annular cover 34, as illustrated in FIG. 6, is placed onto the laying ring 46a axially at the end face.

Figure 7:
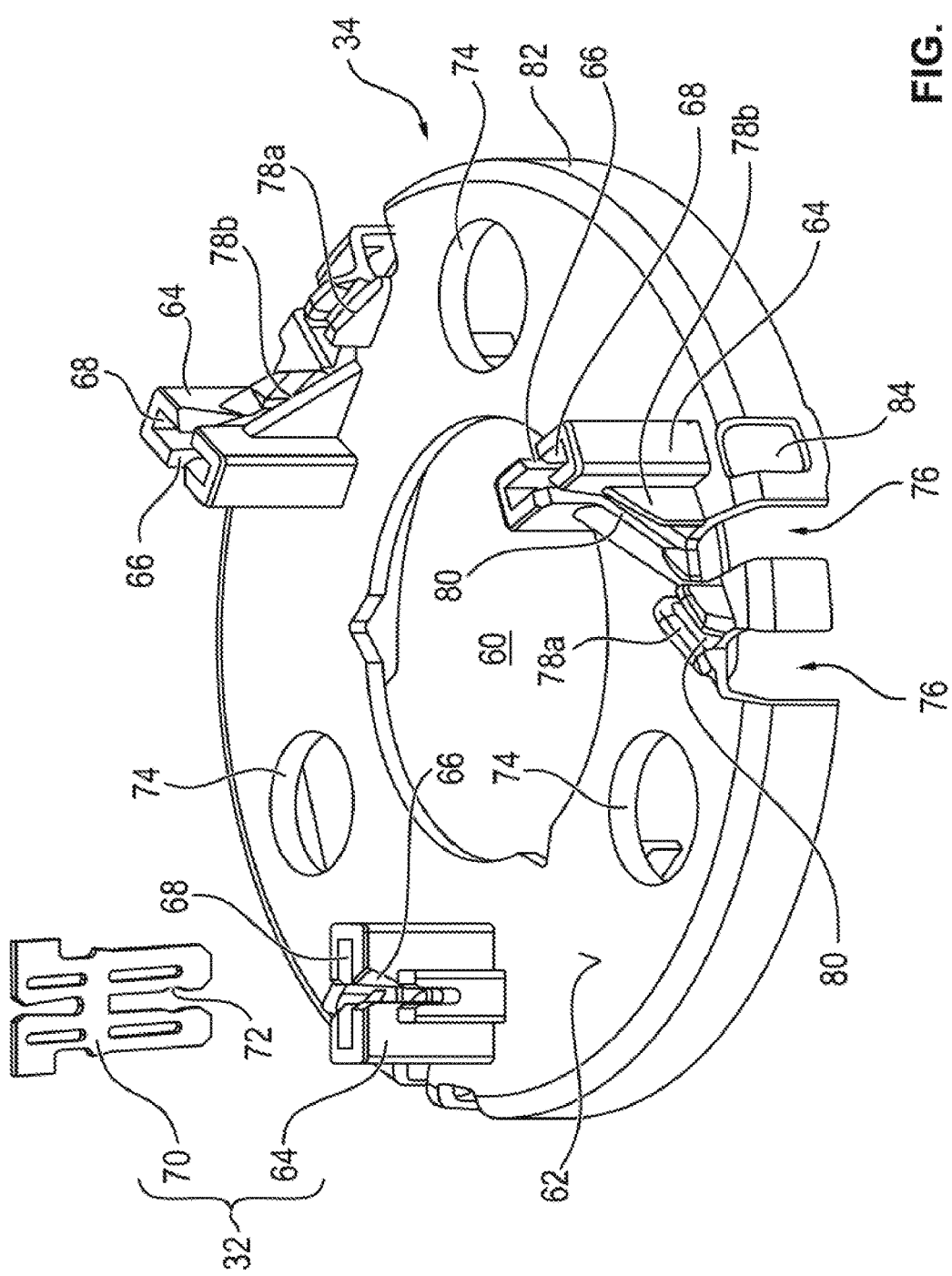
FIG. 7 shows, in a perspective illustration, the annular cover with a removed clamping connector (plug-in element) of an insulation-displacement contact.

The annular cover 34 illustrated separately in FIG. 7 has a central, circular recess 60, which in the assembled state is arranged axially in line in the housing axial direction A with the recess 22 in the housing half 18a so as to guide through the rotor shaft 24. The insulation-displacement contacts 32 are uniformly distributed in the peripheral direction on a housing-half-side end or outer face 62 of the annular cover 34, i.e. are arranged offset from one another by approximately 120° in the illustrated exemplary embodiment.

The insulation-displacement contacts 32 each comprise a U-shaped, sleeve-like insulation-displacement terminal 64 for receiving and contacting the phase ends 44a, 44b. The phase ends 44a, 44b are pushed into a contact slot 66 in the insulation-displacement terminal 64 in a manner arranged axially one above the other and are thus fixed in their positions on the annular cover 34 in a frictionally engaged manner. The contact slot 66 is arranged substantially between the two vertical U-limbs of the insulation-displacement terminal 64 and tapers approximately in a V-shaped manner in the direction of the outer face 62. When the phase ends 44a, 44b are pushed in or clamped, an increasingly greater pressing force is exerted onto the insulating wires of the phase ends 44a, 44b by the side walls of the insulation-displacement terminal 64 due to the tapering, such that a more reliable holding of the phase ends 44a, 44b is ensured.

The vertical U-limbs of the insulation-displacement terminal 64 both have a furrow-like receiving chamber 68, which is open toward the contact slot 66. As indicated in FIG. 3 and FIG. 7, a metal clamping connector 70 can be inserted into the receiving chambers 68. The clamping connector 70 has an approximately U-shaped blade 72 facing toward the insulation-displacement terminal 64. When the clamping connector 70 is inserted, the phase ends 44a, 44b are pressed or squeezed into the contact slot on the one hand in an interlocking and frictionally engaged manner, the blade 72 on the other hand cutting through or at least severing the insulations of the insulating wires. The phase ends 44a, 44b are thus electrically conductively contacted with the clamping connector 70, the clamping connector 70 in turn being contacted in the assembled state with contact elements (not illustrated in greater detail) of the electronics support 14 in order to feed current to the rotating-field winding 40.

Circular recesses 74 in the annular cover 34 are arranged in the peripheral direction in each case between two insulation-displacement contacts 32. In the assembled state the heads of the threaded bolts 20 fastened to the housing half 18a lie in the recesses 74 at least in part, such that it is ensured that the outer face 62 bears against the inner end face of the housing half 18a in the most planar manner possible.

To easily guide and lay the phase ends 44a, 44b from the laying ring 46a to the insulation-displacement contacts 32 on the outer face 62, the annular cover 34 has a recess 76 for each of the six phase ends 44a, 44b. The recesses 76, also referred to hereinafter as slots, are arranged peripherally in pairs in the region of each of the insulation-displacement terminals 64 and are open toward an outer periphery of the annular cover 34.

In order to guide and lay the phase ends 44a, 44b passed through the slots 76 to the insulation-displacement terminals 64, guide elements 78a, 78b are provided on the outer face 62 of the annular cover 34. The guide elements 78a, 78b, which are also referred to hereinafter as laying ramps, both have a furrow-like guide groove 80, in which the phase ends 44a or the phase end 44b lie/lies at least in part in the assembled state. By way of example, merely one guide groove 80 has been provided with a reference sign in the figures.

The laying ramps 78a, 78b lead the phase ends 44a, 44b to be contacted to the insulation-displacement terminals 64 in a manner inclined at an angle of inclination, in such a way that the phase ends 44a, 44b are arranged one above the other substantially in alignment in the housing axial direction A and are guided into the associated contact slot 66 in a tangentially directed manner. For this purpose, the laying ramps 78a and 78b are staggered in the peripheral direction, such that the phase ends 44a and 44b can be laid one above the other axially in a stacked manner in the peripheral direction.

The laying ramps 78a serve to guide the phase ends 44a and are integrally formed on the annular cover 34 between the slot 76 of the phase end 44a in question and the slot 76 of the relevant paired phase end 44b. The laying ramps 78b serve accordingly to guide the phase ends 44b, and are expediently arranged between the slot 76 of the phase end 44b in question and the paired insulation-displacement terminal 64. In particular, the laying ramps 78b are formed here substantially integrally in one piece on the insulation-displacement terminals 64, in such a way that the guide grooves 80 in the laying ramps 78b are arranged in line with the tapered region of the contact slot 66.

The annular cover 34 comprises a cover edge 82, which extends over the outer periphery and in the assembled state engages around the laying ring 46a at least in part. In particular, the outer periphery of the cover edge 82 is in line with the outer periphery of the stator laminated core 38, such that the installation diameter of the stator module 34 is given substantially by the diameter of the stator laminated core 38. The cover edge 82 has, in the region of each of the insulation-displacement contacts 32, an approximately rectangular recess 84 as detent receptacle for a detent tongue 86 of the laying ring 46a.

The detent tongues 86 are extensions of the termination 58 of the laying ring 46a directed toward the outer periphery of the stator laminated core 38. As can be clearly seen in particular in FIG. 5, the detent tongues 86 serve at least in part as guide elements for peripherally guiding the phase windings 44 behind the stator teeth 42. In order to fasten the annular cover 34 to the laying ring 46a without destruction, the annular cover 34 is placed axially onto the laying ring 46a, the annular cover 34 being oriented in such a way that the detent tongues 86 of the laying ring 46a latch with the recesses 84 in the cover edge 82.

The invention is not limited to the above-described exemplary embodiment. Rather, other variants of the invention can also be derived herefrom by a person skilled in the art, without departing from the subject matter of the invention. In particular, all individual features described in conjunction with the exemplary embodiment can also be combined differently with one another without departing from the subject matter of the invention.

LIST OF REFERENCE SIGNS

2 motor module
4 electronics unit
6 plug connector
8 electric motor
10 motor support/housing shell
12 cooling cover/housing shell
14 electronics support
16 fastening screw
18 motor housing
18a, 18b housing halves
20 threaded bolt
22 recess
24 rotor shaft
26 rotor
28 cap
30 recess
32 contact element/insulation-displacement contact
34 annular cover
36 stator module
38 stator laminated core
40 rotating-field winding
42 stator tooth
44 phase winding
46a, 46b laying ring
48 annular body
50 coil body
52 inner flange
54 outer flange
56 indentation
58 termination
60 recess
62 outer face
64 insulation-displacement terminal
66 contact slot
68 receiving chamber
70 clamping connector
72 blade
74 recess
76 recess/slot
78a, 78b guide element/laying ramp
80 guide groove
82 cover edge
84 recess/detent receptacle
86 detent tongue
A housing axial direction

The invention claimed is:

1. A stator module for an electric motor, the stator module comprising:
a stator laminated core formed with a plurality of inwardly directed stator teeth and having an end face;
a winding with a plurality of phases arranged on said stator teeth, said winding having at least one coil per phase, said coil being electrically connected to a first phase end and a second phase end;
a laying ring disposed on said end face of said stator laminated core, said laying ring surrounding said stator teeth and forming a coil body for guiding said winding;
an annular cover disposed on said laying ring, wherein each of said phase ends is contacted on said annular cover with one of said phase ends of another phase, such that said winding does not protrude radially externally beyond an outer periphery of said stator laminated core;
contact elements for contacting and fixing said phase ends mounted on an outer side of said annular cover facing away from said stator laminated core; and
guide elements for guiding said phase ends integrally formed or mounted on an outer side of said annular cover, said guide elements being laying ramps configured to guide said phase ends, axially stacked on top of one another, to said contact elements.

2. The stator module according to claim 1, wherein said contact elements are insulation-displacement contacts.

3. The stator module according to claim 1, wherein said winding is a three-phase winding and said phase ends are contacted in a delta connection.

4. The stator module according to claim 1, wherein said contact elements are uniformly distributed on said annular cover in a circumferential direction.

5. The stator module according to claim 1, wherein said annular cover is formed with a through-going recess for each said phase end and the respective said phase end passes through said recess.

6. The stator module according to claim 5, wherein said recess is one of a plurality of recesses formed as slots that are open toward an outer periphery of said annular cover.

7. The stator module according to claim 1, wherein said laying ring has a termination protruding axially beyond said stator laminated core in order to peripherally guide said winding behind said stator teeth, and said annular cover is latched to said termination.

8. An electric motor for an actuator, comprising a stator module according to claim 1.

9. An electric motor for a transmission actuator of a motor vehicle, comprising a stator module according to claim 1.

* * * * *